United States Patent
Tempel

(10) Patent No.: US 9,677,680 B2
(45) Date of Patent: Jun. 13, 2017

(54) SANITARY INSTALLATIONS AND SHOWER ASSEMBLY

(71) Applicant: Neoperl Gmbh, Mullheim (DE)

(72) Inventor: Marc Tempel, Freilburg (DE)

(73) Assignee: NEOPERL GMBH, Mullheim (DE)

( * ) Notice: Subject to any disclaimer, the term of this patent is extended or adjusted under 35 U.S.C. 154(b) by 84 days.

(21) Appl. No.: 14/772,977

(22) PCT Filed: Feb. 7, 2014

(86) PCT No.: PCT/EP2014/000345
§ 371 (c)(1),
(2) Date: Sep. 4, 2015

(87) PCT Pub. No.: WO2014/139619
PCT Pub. Date: Sep. 18, 2014

(65) Prior Publication Data
US 2016/0010759 A1    Jan. 14, 2016

(30) Foreign Application Priority Data

Mar. 11, 2013 (DE) .................. 20 2013 002 281

(51) Int. Cl.
| F16K 31/00 | (2006.01) |
| G05D 23/02 | (2006.01) |
| E03C 1/04 | (2006.01) |
| E03C 1/044 | (2006.01) |
| E03C 1/02 | (2006.01) |

(52) U.S. Cl.
CPC ............ *F16K 31/002* (2013.01); *E03C 1/044* (2013.01); *E03C 1/0408* (2013.01); *G05D 23/022* (2013.01); *E03C 2001/026* (2013.01)

(58) Field of Classification Search
CPC .. F16K 31/002; E03C 1/044; E03C 2001/026; G05D 23/022
USPC ......................................................... 137/468
See application file for complete search history.

(56) References Cited

U.S. PATENT DOCUMENTS

| 2,569,359 | A | * | 9/1951 | Vellinga | .................. F16K 1/221 236/34 |
| 3,118,648 | A | * | 1/1964 | Campbell | ............ G05D 23/022 236/100 |
| 3,381,469 | A | | 5/1968 | Schwartz | |
| 3,624,578 | A | | 11/1971 | Stocker et al. | |

(Continued)

FOREIGN PATENT DOCUMENTS

| CN | 1083943 A | 3/1994 |
| CN | 101939716 A | 1/2011 |

(Continued)

OTHER PUBLICATIONS

English translation of Chinese Office Action in counterpart application, mailed Feb. 3, 2016.

*Primary Examiner* — Umashankar Venkatesan
(74) *Attorney, Agent, or Firm* — Volpe and Koenig, P.C.

(57) ABSTRACT

A sanitary fixture (1), including a flow regulator unit (5) and a movable adjustment element (6) that adjusts a flow rate and has a control connection to a temperature-sensitive control element (8). The invention provides arranging a return spring (13) on a same side of the flow regulator unit (5) as the control element (8), with respect to the flow direction, and/or designing the control element (8) to assume at least one intermediate position.

13 Claims, 6 Drawing Sheets

(56) References Cited

U.S. PATENT DOCUMENTS

| | | | |
|---|---|---|---|
| 3,841,551 A | 10/1974 | Ota | |
| 4,180,208 A * | 12/1979 | Obermaier | G05D 23/022 236/100 |
| 4,386,584 A * | 6/1983 | Calkins | G05D 23/022 123/41.08 |
| 6,988,364 B1 * | 1/2006 | Lamb | F16K 31/002 60/508 |
| 7,086,602 B2 * | 8/2006 | Yang | F16K 31/002 236/12.2 |
| 7,878,417 B2 * | 2/2011 | Brown | E03C 1/0408 236/93 A |
| 7,886,987 B2 * | 2/2011 | Guterman | E03C 1/041 236/100 |
| 7,971,601 B2 * | 7/2011 | Lum | F16K 31/002 137/337 |
| 8,464,962 B2 * | 6/2013 | Lockhart | E03C 1/0408 236/93 A |
| 2009/0007972 A1 | 1/2009 | Lun et al. | |
| 2009/0308459 A1 | 12/2009 | Gross | |
| 2011/0209769 A1 * | 9/2011 | Chun | F03G 7/06 137/2 |
| 2012/0247582 A1 | 10/2012 | Lamb et al. | |
| 2013/0025719 A1 * | 1/2013 | Yang | F15D 1/025 137/599.01 |
| 2015/0096116 A1 * | 4/2015 | Doss | E03C 1/023 4/570 |
| 2016/0251837 A1 * | 9/2016 | Brown | E03C 1/0408 |

FOREIGN PATENT DOCUMENTS

| | | |
|---|---|---|
| DE | 10132001 A1 | 1/2003 |
| GB | 2339885 | 2/2000 |

\* cited by examiner

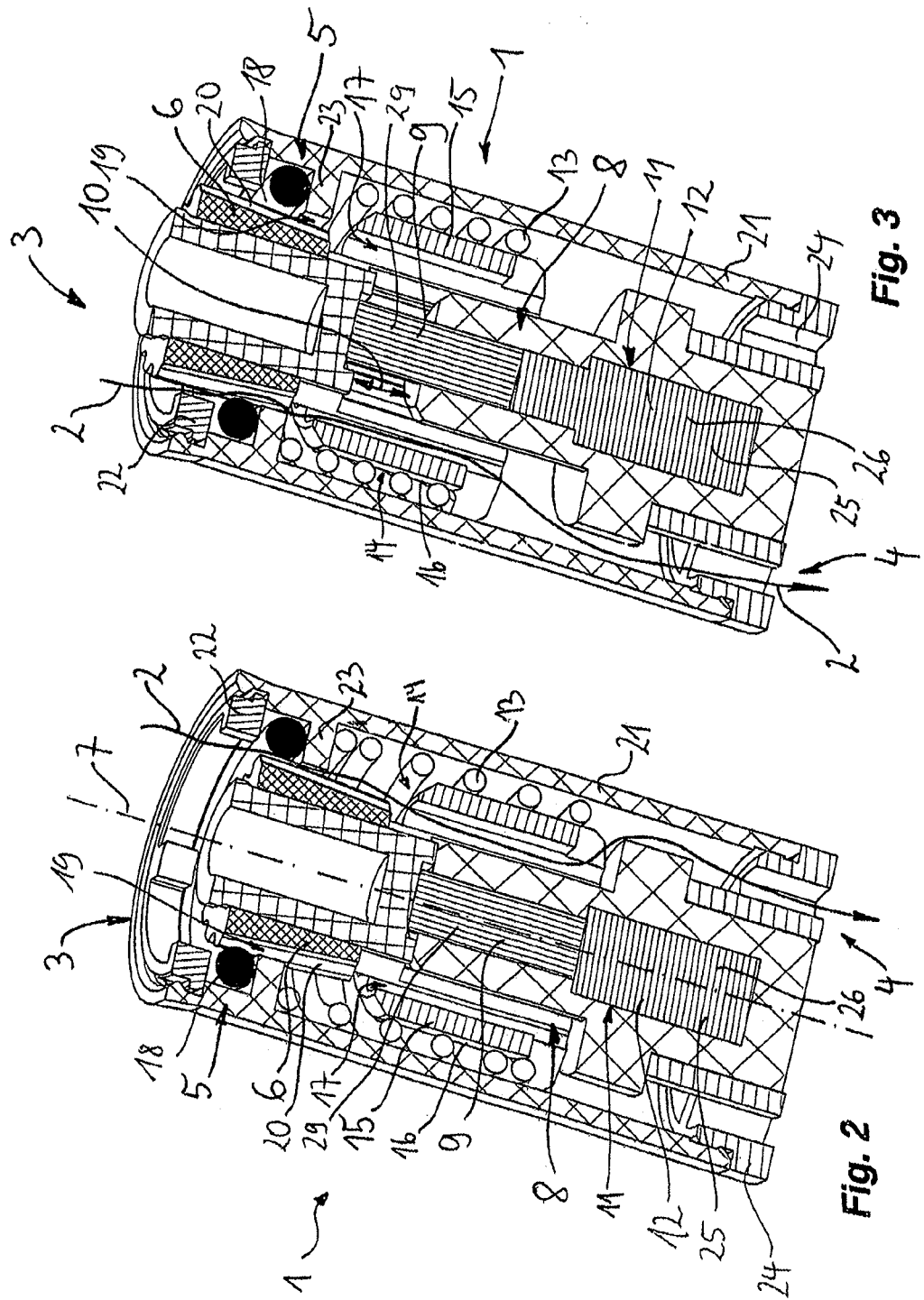

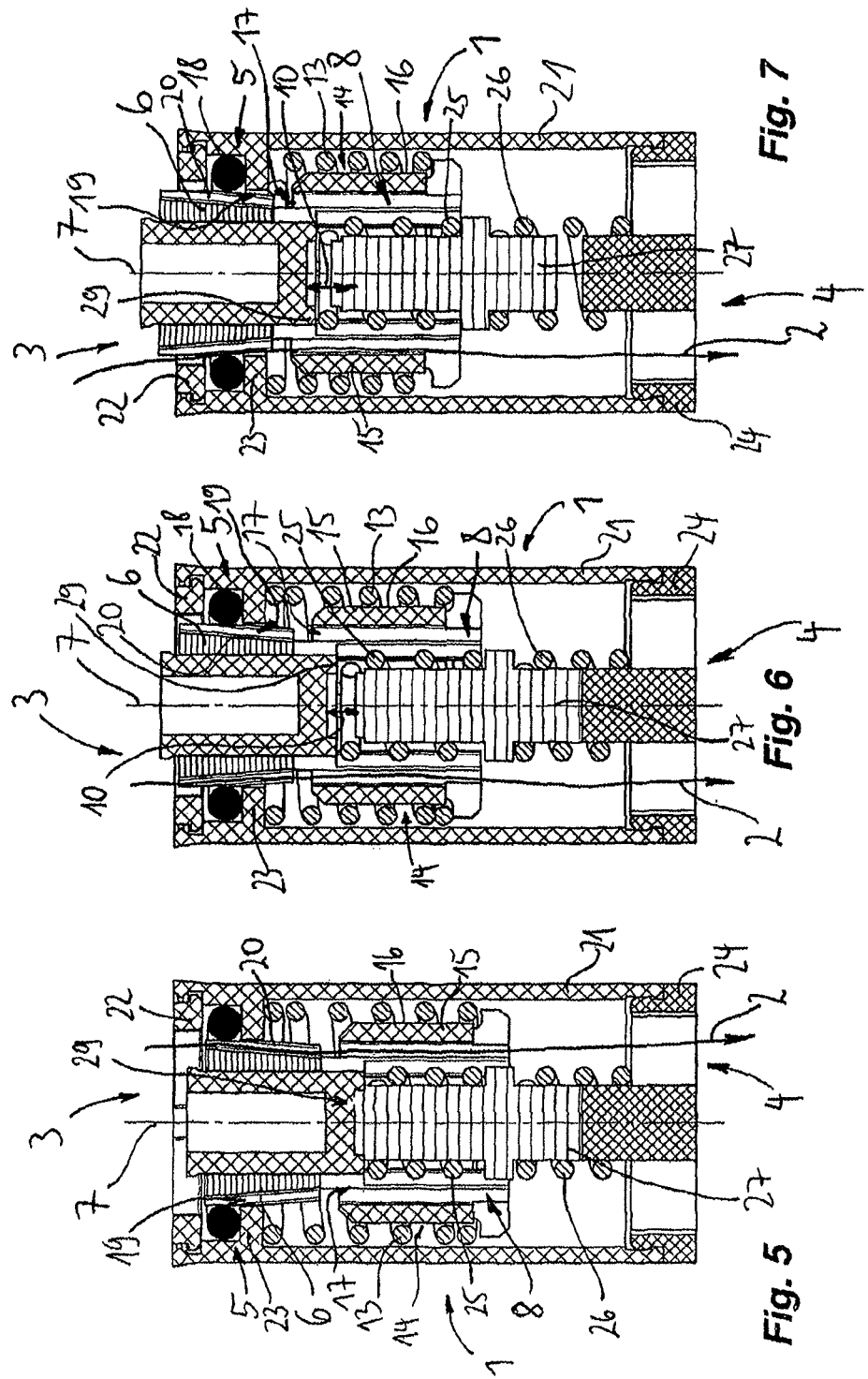

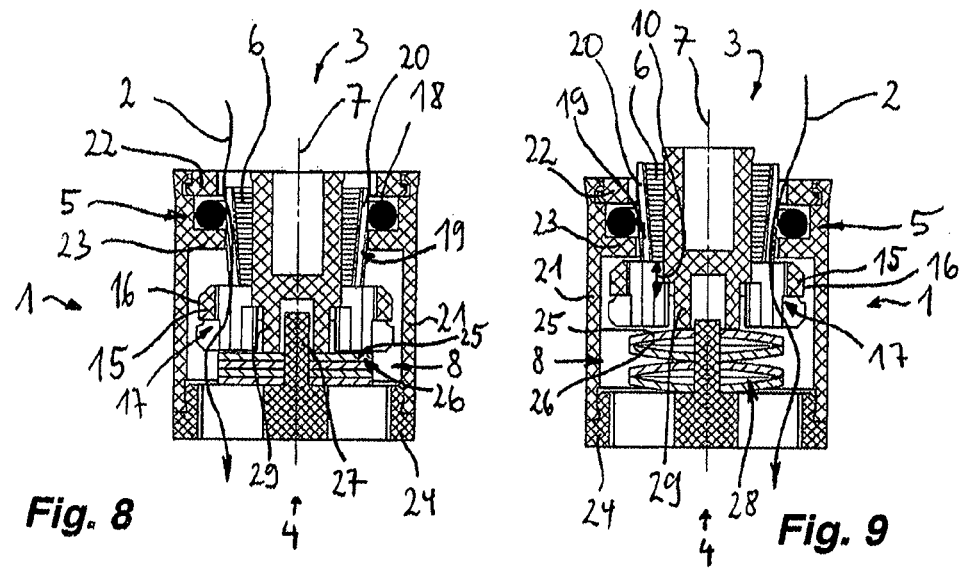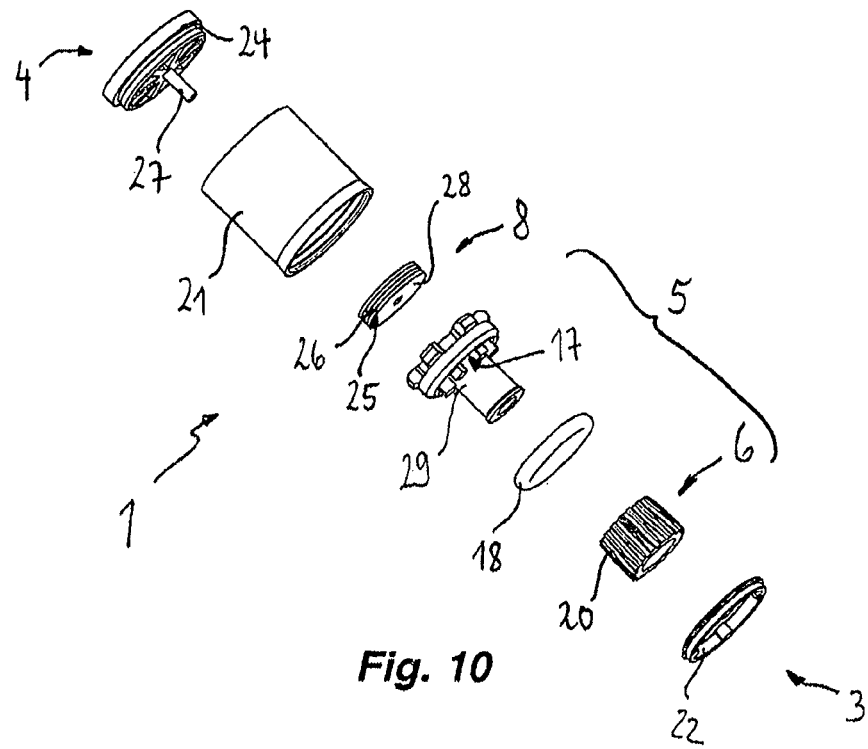

SANITARY INSTALLATIONS AND SHOWER ASSEMBLY

BACKGROUND

The invention relates to a sanitary fixture having a flow regulator unit which is arranged in a flow path and has a movable adjustment element, wherein a throughflow rate defined by the flow regulator unit is settable by way of the adjustment element, and having a control element which changes shape and/or size depending on the temperature, is arranged in the flow path and is operatively connected to the adjustment element, wherein, by way of the control element, in the event of a change in the temperature over a temperature range between a lower temperature value and an upper temperature value, the adjustment element is displaceable along an adjustment path between a starting position and an end position.

The invention furthermore relates to a sanitary fixture, in particular as described previously, having a flow regulator unit which is arranged in a flow path and has a movable adjustment element, wherein a throughflow rate defined by the flow regulator unit is settable by way of the adjustment element, and having a control element which changes shape depending on the temperature, is arranged in the flow path and is operatively connected to the adjustment element, wherein an increase in the temperature at the control element causes a displacement of the adjustment element towards larger throughflow rates, and having a restoring spring that acts on the adjustment element.

The invention finally relates to a shower arrangement having a heating element which is arranged in a flow path and is designed preferably with a constant heat output, and having a sanitary fixture connected upstream of the heating element in the flow direction.

Sanitary fixtures of this type are known and are used in order to supply a throughflow rate as a function of an input temperature to a heating element with a constant heat output in such a manner that the temperature of the heated liquid is virtually constant. Use is made here of the fact that a greater throughflow rate has to be set at a higher input temperature if the intention is to prevent the heating element from heating the liquid beyond a temperature limit value.

For example, GB 2339885 B discloses a sanitary fixture in which an adjustment element can be switched over discretely and steplessly between one specific summer position and one specific winter position in order to take into account the increased input temperature of the water during summer.

SUMMARY

The invention is based on the object of improving the use properties of a sanitary fixture.

In order to achieve the object mentioned, one or more features of the invention are used. In particular, it is therefore provided, in the case of a sanitary fixture of the type mentioned at the beginning, that, at at least one intermediate temperature value between the lower temperature value and the upper temperature value, the control element sets an intermediate position of the adjustment element in the adjustment path between the starting position and the end position. It is advantageous here that the throughflow rate can be more precisely regulated at the control element as a function of the temperature. It is furthermore advantageous here that a greater temperature range can be achieved with a useful regulating action than would be the case in an arrangement which can be switched over between only two positions.

In an advantageous refinement, it can be provided that the intermediate position is spaced apart from the starting position and/or end position by at least 1%, preferably at least 10%, particularly preferably at least 30%, of an overall length of the adjustment path. It is advantageous here that the intermediate position is therefore arranged clearly spaced apart from the starting position and the end position, and therefore a significantly differing throughflow rate is settable. Perceptible intermediate stages are therefore settable.

In an advantageous refinement, it can be provided that the control element assumes three different shapes and/or sizes at at least three different temperature values. It is advantageous here that a sequence of defined states is usable for the regulation.

In an advantageous refinement, it can be provided that the control element has at least two material components which have different configurations of expansion within the temperature range. It is advantageous here that the different coefficients of expansion are usable in order to achieve a temperature-dependent shape change, by means of which the adjustment element is actuable.

For example, it can be provided that the adjustment element has a bimetallic element. The bimetallic element can be, for example, a bimetallic strip or a bimetallic disk. It is advantageous here that bimetallic elements are favorably priced and are reliable.

Alternatively or additionally, it can be provided that the control element has at least two material components which have different phase transition temperatures within the temperature range. The use of materials with phase transition has the advantage that the rapid shape and/or size change during the phase transition is usable for the displacement of the adjustment element. Macroscopic size changes which do not have to be reinforced in order to cover a sufficient adjustment path are also achievable at phase transitions.

In an advantageous refinement, it can be provided that the material components are arranged in succession in an adjustment direction. By this means, larger adjustment paths are achievable. Material components having different phase transition temperatures can also be used. The effect can thereby be achieved that, at different temperatures, different material components pass through a phase transition, thus producing a stepped temperature profile.

In an advantageous refinement, it can be provided that the material components are formed in each case from a material having shape memory. Materials having shape memory constitute a readily handleable alternative to thermowaxes since, at normal operating temperatures, these materials do not form a liquid state of aggregation. In addition, a defined shape change is achievable.

In an advantageous refinement, it can be provided that the material components form a material mixture. A compact control element which assumes different shapes and/or expansions at different temperatures can thereby be formed.

For example, it can be provided that the material mixture is a thermowax mixture, wherein the material components are in each case a thermowax component and the phase transition temperatures are given by the particular melting point of the thermowax component. Thermowaxes have proven successful as temperature-dependent control elements in the sanitary sphere. A desired phase transition temperature can be set in a simple manner by adding additional substances. The temperature range which can be covered can therefore be expanded and provided with a multiplicity of support points.

In an advantageous refinement, it can be provided that the adjustment element defines a lower throughflow rate in the starting position than in the end position. The throughflow rate is therefore lower at low temperatures than at higher temperatures at the control element. By this means, a liquid with a low input temperature has a greater residence period in the circuit and can therefore be heated more. As a result, an inflowing liquid with a low temperature is heated more than an inflowing liquid with a high temperature. As a result, it can even be achieved that the output temperature is virtually or precisely constant without a heat output having to be adjusted.

Alternatively or additionally, it can be provided that an increase in the temperature at the control element causes a displacement of the adjustment element toward larger throughflow rates. The sanitary fixture can therefore be usable in order to compensate for a fluctuating input temperature of an inflowing liquid by means of a change in the throughflow rate in such a manner that a constant temperature is reached by way of a downstream heating element of constant heat output.

It can also be provided that a throughflow rate of the flow regulator unit which increases with increasing temperature is set by way of the control element and the adjustment element. The residence period of a liquid which is already warm in the circuit can therefore be shortened such that overheating of the liquid can be avoided.

A refinement of independent inventive quality can provide the features in order to achieve the object mentioned. In particular, it is therefore provided, according to the invention, in the case of a sanitary fixture of the type described at the beginning that the control element and the restoring spring are arranged in the flow path on the same side of the flow regulator unit. It is advantageous here that a compact design is achievable which is usable versatiley.

In an advantageous refinement, it can be provided that the restoring spring and the control element are arranged on the downstream side in relation to the flow regulator unit. The temperature control is therefore arranged downstream of the flow regulation.

In an advantageous refinement, it can be provided that the restoring spring is in the form of a helical spring, of a zigzag spring or of a disk spring or stacked arrangement of disk springs. It is advantageous here that the restoring spring requires little space. A zigzag spring requires particularly little construction space and permits production of a large amount of force with little pretension. A zigzag spring can be described as a helically wound, preferably flat wire which forms troughs and peaks over the profile thereof. The individual windings can therefore be in contact in the relaxed state or (pre)tensioned state without the zigzag spring being blocked. The troughs and peaks of the individual windings are frequently offset in the circumferential direction in such a manner that in each case one peak of a winding is in contact with a trough of the adjacent winding, and vice versa. By this means, elasticity can be achieved even beyond the contacting position.

In an advantageous refinement, it can be provided that the control element and/or a control connection between the adjustment element and the control element passes through an interior space in the flow path, said interior space being enclosed or at least radially bounded by the restoring spring. It is advantageous here that a short axial overall length can be achieved, since the control element and/or the control connection can be at least partially arranged in an interior space enclosed or bounded by the restoring spring. It is particularly favorable in this connection if the restoring spring is in the form of a helical spring, of a zigzag spring or of a disk spring or stacked arrangement of disk springs.

In an advantageous refinement, it can be provided that a guide element carrying the restoring spring is formed on the adjustment element. It is particularly favorable in this connection if the guide element is integrally formed in the adjustment element. It is advantageous here that an action by the restoring spring can be implemented in a guided manner.

In an advantageous refinement, it can be provided that the guide element encloses a throughflow duct. It is advantageous here that the guide element, in addition to the function thereof as a guide for the restoring spring, can additionally take on the function of conducting the liquid. The number of necessary components can therefore be reduced.

It is particularly favorable in this connection if the control element is coupled thermally to the throughflow duct. It is advantageous here that the control element can react rapidly or with a short reaction time to temperature fluctuations in the inflowing liquid. This once again considerably increases the comfort during use of the heated up liquid.

In an advantageous refinement, it can be provided that a cross-sectional area of an opening is settable by way of the adjustment element. It is advantageous here that a flow regulator function with a variable throughflow rate can be realized in a simple manner.

In an advantageous refinement, it can be provided that the adjustment element has a basic shape that narrows. A conical basic shape can be handled in a particularly simple manner here. It is advantageous here that a size change in the cross-sectional area of an opening can be realized in a simple manner by a change in position of the adjustment element.

In an advantageous refinement, it can be provided that the adjustment element passes through an O-ring, wherein the O-ring, in the event of an increasing pressure difference across an opening, narrows the or an opening. It is advantageous here that a flow limitation can be realized in a simple manner.

In an advantageous refinement, it can be provided that the adjustment element has grooves that extend radially on the outside along the flow path. It is advantageous here that a flow limitation can be realized by way of an O-ring bearing against the grooves.

In an advantageous refinement, it can be provided that the flow regulator unit, the control element and the restoring spring are arranged in a tubular sleeve. It is advantageous here that a housing-forming closure to the outside can be formed.

In an advantageous refinement, it can be provided that the flow regulator unit is formed or supported at a first axial end and the control element is supported at a second axial end. It is advantageous here that abutments for the expansion and contraction movements of the control element can be provided.

In order to achieve the object mentioned, the invention proposes, in the case of a shower arrangement of the type described at the beginning, that the sanitary fixture is designed according to the invention, in particular as previously described. It is advantageous here that a multi-stage adaptation of the throughflow rate to an input temperature of an inflowing liquid and/or a compact design can be achieved.

BRIEF DESCRIPTION OF THE DRAWINGS

The invention is now described in more detail with reference to exemplary embodiments, but is not restricted to these exemplary embodiments. Further exemplary embodiments emerge from combining the features of individual claims or of a plurality of claims with one another and/or with individual features or a plurality of features of the exemplary embodiments.

In the drawings:

FIG. 2 shows the sanitary fixture from FIG. 1 in a sectional illustration, FIG. 3 shows the sanitary fixture from FIG. 1 in a sectional illustration with a shape-changed control element, FIG. 5 to FIG. 7 show the sanitary fixture from FIG. 4 in a sectional illustration in each case with an adjustment element located in different positions, FIG. 8 shows a further sanitary fixture according to the invention in a sectional illustration in the starting position with cold water, FIG. 9 shows the sanitary fixture according to FIG. 8 in the end position with hot water, FIG. 10 shows the sanitary fixture according to FIG. 8 in a three-dimensional exploded illustration.

DETAILED DESCRIPTION OF THE PREFERRED EMBODIMENTS

Figure 1:
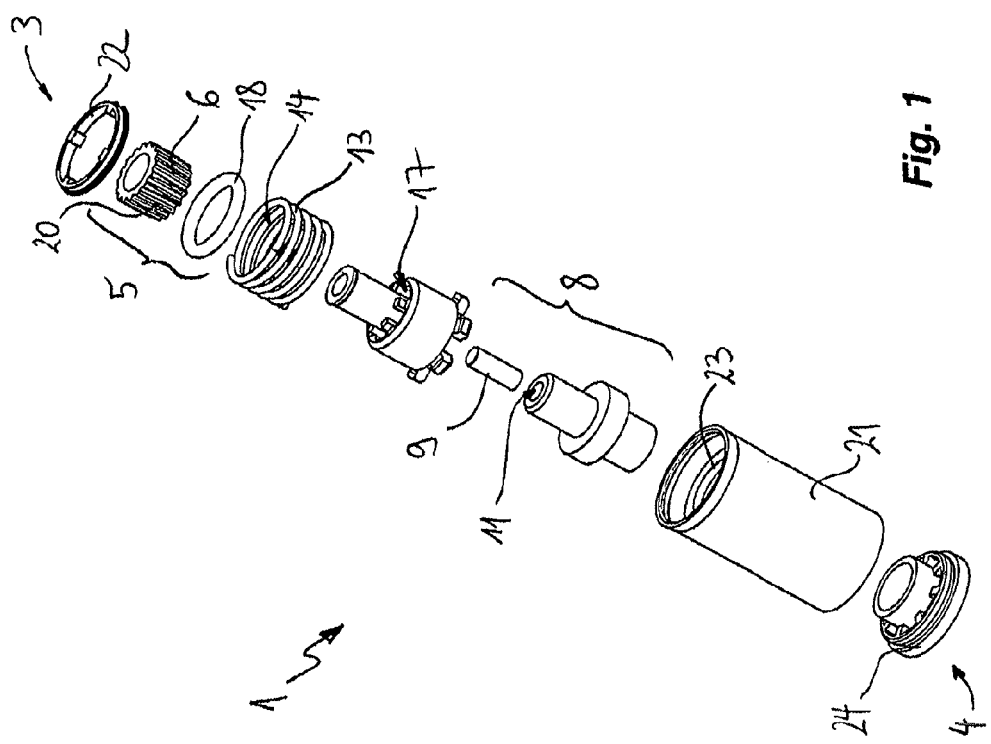
FIG. 1 shows a sanitary fixture according to the invention in an exploded illustration.
Figure 4:
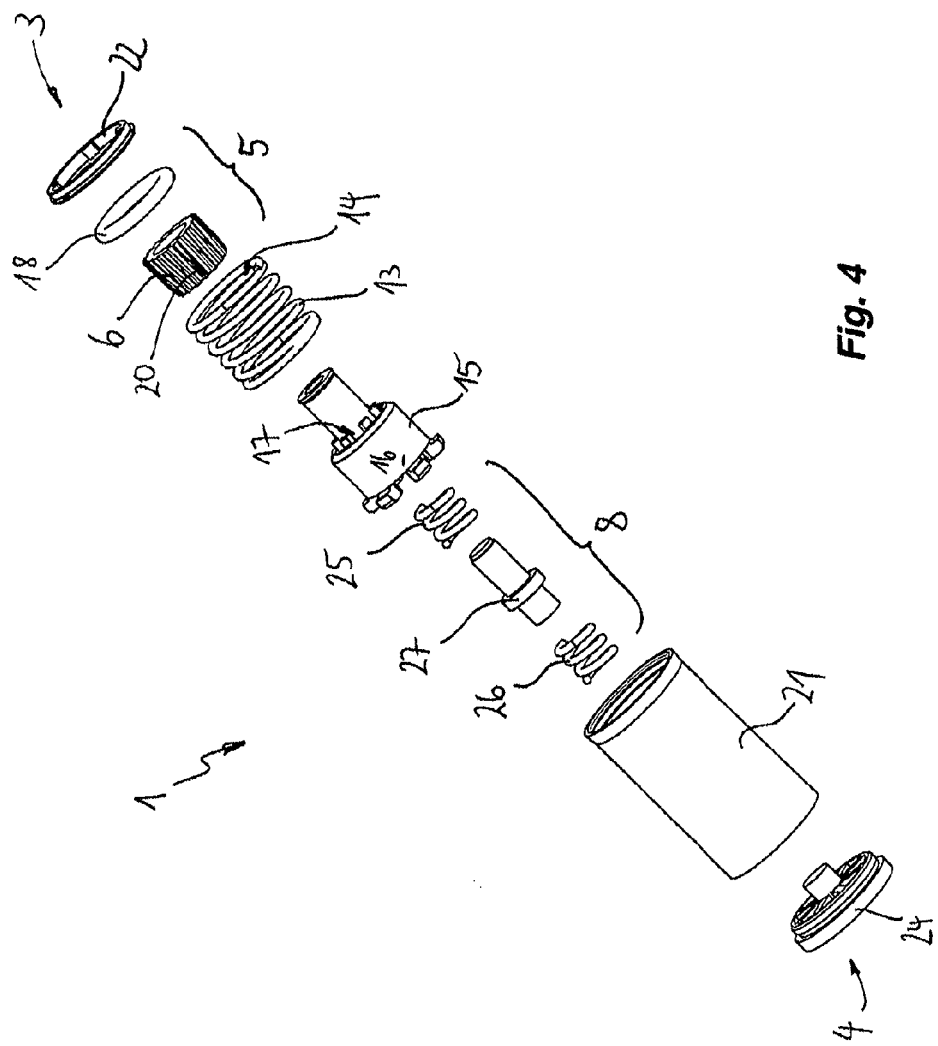
FIG. 4 shows a further sanitary fixture according to the invention in an exploded illustration with a control element having shape memory.

FIG. 1 shows a sanitary fixture 1 according to the invention in an exploded illustration.

FIGS. 2 and 3 show the sanitary fixture 1 from FIG. 1 in sectional illustrations in different switching positions.

FIGS. 1, 2 and 3 are described together below.

A flow path 2 which leads from an input side 3 to an output side 4 is formed in the sanitary fixture 1.

A flow regulator unit 5 is arranged in the flow path 2.

The flow regulator unit 5 has a movable adjustment element 6.

The adjustment element 6 is arranged movably axially, i.e. parallel to a longitudinal axis 7, in the sanitary fixture 1.

By means of this movement, a changeable throughflow rate along the flow path 2 is settable by way of the adjustment element 6.

A control element 8 which has a size or shape which is changeable with the temperature prevailing at the control element 8 is furthermore arranged in the flow path 2.

The control element 8 is operatively connected to the adjustment element 7 and sets the position of the latter by means of the size and/or shape change as a function of the temperature.

The control element 8 has a piston 9, the position of which is displaceable between a retracted starting position (FIG. 2) and an extended end position (FIG. 3).

The starting position belongs here to a low temperature value while the end position is taken up at an upper temperature value.

In the event of a change in the temperature over the temperature range between the lower temperature and the upper temperature, the control element 8 displaces the adjustment element 6 along the adjustment path 10.

A material mixture 12 is arranged in a receiving chamber 11 of the control element 8. This material mixture 12 has a plurality of material components 25, 26 which in each case have differing phase transition temperatures. Alternatively, the material components 25, 26 can be arranged separately from one another in succession along the adjustment path in the receiving chamber 11 in order to act serially.

In the exemplary embodiment, the material mixture 12 is a thermowax mixture, and the material components are different thermowaxes having an individual phase transition temperature in each case. The phase transition temperatures here are melting points.

In the event of heating or cooling over the temperature range mentioned, these phase transition temperatures are reached successively.

During each phase transition temperature, the associated material component passes through a phase transition and expands abruptly during heating and/or contracts abruptly during cooling. By this means, the piston 8 is driven outward by a predetermined distance.

Since the phase transition temperatures are distributed spaced apart from one another over the temperature range, a stepped expansion/contraction is thus produced.

A continuous, temperature-dependent code of the adjustment element 6 is thus produced approximately with a quality of approximation which increases with the number of material components used.

The individual intermediate positions are distributed uniformly over the adjustment path 10, and therefore intermediate positions which are away from the starting position and the end position by at least 10% or even at least 30% of the overall length of the adjustment path 10 exist and are taken up.

FIGS. 2 and 3 show two sizes of the control element 8 that belong to two temperature values. In order to set the remaining intermediate positions, the control element 6 assumes sizes lying between the extreme positions. These intermediate positions belong in each case to an individually assigned temperature value.

The adjustment element 6 has a conical basic shape which narrows counter to the adjustment direction in the event of an increase in the temperature.

By this means, the cross-sectional area of the opening 19 is larger at high temperatures than at low temperatures.

This means that the higher the input temperature at the control element 8, the more rapidly the liquid in the sanitary fixture 1 flows. By this means, the liquid heats up less strongly.

On the other hand, the cross-sectional area decreases if the input temperature decreases and therefore the difference between the input temperature and a (constant) output temperature increases. This is because the liquid then has to be limited in terms of throughflow rate to a greater extent in order to be able to ensure sufficient heating.

Furthermore, a restoring spring 13 which restores the adjustment element 6 into the starting position in the event of cooling is arranged in the sanitary fixture 1.

The restoring spring 13 is arranged downstream of the flow regulator unit 5 in the flow path 2 and is therefore arranged on the same side of the flow regulator unit 5 as the control element 8.

The restoring spring 13 is in the form of a helical spring and encloses the control element 8.

In other words, the control element 8 is at least partially arranged in an interior space 14 bounded by the restoring spring 13 (at least in the state thereof according to FIG. 2). The control connection 29, here the piston 9, via which the control element 8 displaces the adjustment element 6, therefore reaches through the interior space 14.

In further exemplary embodiments, the restoring spring 13 is in the form of a zigzag spring 35 instead of the helical spring.

Figure 12:
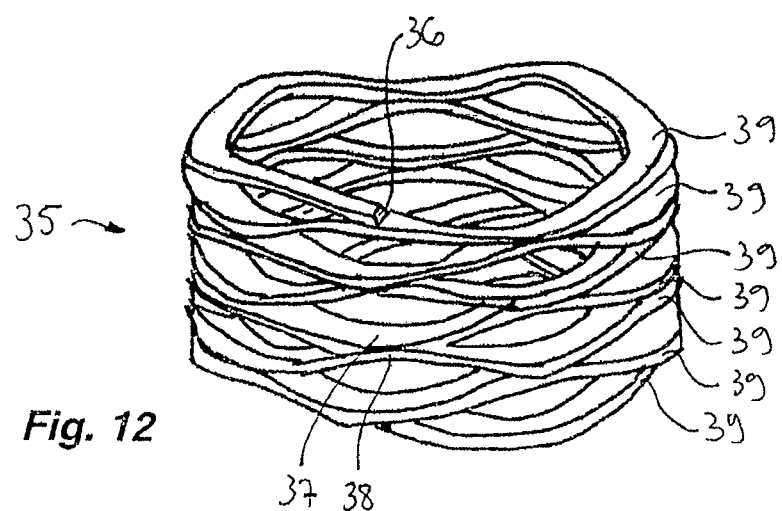
FIG. 12 shows a zigzag spring.

A zigzag spring 35 of this type is shown by way of example in FIG. 12.

The zigzag spring 35 is wound helically like a helical spring.

However, in contrast to a conventional helical spring, the wire 36 forms troughs 37 and peaks 38 in the profile thereof.

FIG. 12 shows a state of the zigzag spring 35, in which the windings 39 are in contact in a puncture form or sectional manner without the zigzag spring 35 being blocked. On the contrary, the zigzag spring 35 can be compressed further in the axial direction.

The troughs 37 and peaks 38 of the individual windings 39 are offset in the circumferential direction in such a manner that one peak 38 in each case of a winding 39 is in contact with a trough 37 of the adjacent winding 39, and vice versa. This results in the elasticity mentioned even beyond the contacting position.

In addition, a guide element 15 which is connected to the adjustment element 6 is arranged in the interior space 14 in FIGS. 1 to 3.

The guide element 15 has, radially on the outer side, an outer cylinder 16, against which the restoring spring 13 bears for guidance.

An axially extending throughflow duct 17, through which the flowing liquid is conducted onto the control element 8, is formed in the guide element 15.

The control element 8 is therefore coupled readily thermally to the temperature of the flowing liquid.

For regulation of the flow rate, the flow regulator unit 5 has an O-ring 18 through which the adjustment element 6 passes.

This O-ring 18, in the event of an increasing inflow-side pressure, is pressed against an annular opening 19, as a result of which the latter is narrowed ever further. Grooves 20 that extend along the flow path 2 and against which the O-ring 19 bears are formed on the adjustment element 6, which is provided with a conical basic shape.

The flow resistance is increased by the narrowing, as a result of which the desired flow rate limitation is produced.

By displacement of the adjustment element 6 in the axial direction, the cross-sectional area of the opening 19 can be changed, and therefore a different value is produced for the throughflow rate of the flow rate limitation realized. In the shown arrangement of the adjustment element 6 and of the control element 8, an increasing throughflow rate is produced with increasing temperature at the control element 8.

The sanitary fixture 1 is surrounded to the outside in a housing-building manner by a tubular sleeve 21 which is designed to be open on the input side 3 and the output side 4.

The tubular sleeve 21 accommodates the flow regulator unit 5, the control element 8 and the restoring spring 13.

A first insert 22 which holds the O-ring 18 is clipped into place at the axial end of the input side 3.

On the inner side, a rib 23 on which the restoring spring 13 is supported is formed in the tubular sleeve 21 at the axial end. The rib 23 also carries the O-ring 18. A plurality of ribs which take over holding functions can also be formed axially next to one another.

A second insert 24 on which the control element 8 is supported is clipped into place at the second axial end, i.e. at the output side 4.

A functionally pre-assemblable unit of a sanitary fixture 1 is therefore provided, which unit can be fitted as a whole.

A heating element (not illustrated specifically) which is known per se and has a constant heat output is connected to the output side 4 during operation. Depending on the temperature on the input side 3, the sanitary fixture 1 increases or reduces the throughflow rate in order to be able to heat the liquid flowing out on the output side, for example water, to a constant temperature without having to vary the heat output.

FIGS. 4 to 7 show a further sanitary fixture 1 according to the invention. Components and functional units which are similar or are identical structurally and/or functionally to the exemplary embodiment according to FIGS. 1 to 3 are denoted by the same reference numbers and are not described separately. The above explanations therefore apply correspondingly.

The sanitary fixture 1 according to FIGS. 4 to 7 differs from the sanitary fixture 1 according to FIGS. 1 to 3 in that, instead of the material mixture 12, two material components 25, 26 are arranged serially in succession in the flow path 2.

A guide element 27 guides the material components 25, 26 and connects them to each other.

The material components 25, 26 are manufactured from different materials having shape memory and each have a phase transition temperature, above which said materials abruptly expand.

The phase transition temperature can be set by suitable selection of additives.

The material component 25 here has a lower phase transition temperature than the material component 26.

FIG. 5 shows the sanitary fixture 1 at the lower temperature value.

The two material components 25, 26 are contracted, and a minimal throughflow is set at the flow regulator unit 5.

If the inflowing water is then heated, first of all the phase transition temperature of the first material component 25 is reached, and said material component abruptly expands by a certain amount. The opening 19 is therefore opened somewhat further and then takes up an intermediate position between the starting position according to FIG. 5 and the end position according to FIG. 7. The situation according to FIG. 6 is produced.

If the temperature of the inflowing liquid then remains constant, the situation remains in the intermediate position according to FIG. 6. In other words, the intermediate position is stable.

If the temperature of the inflowing liquid is increased further, the phase transition temperature of the second material component 26 is reached, and the latter expands abruptly.

The expansions of the interior components 25, 26 are cumulative as a result since said material components are arranged serially.

The end position according to FIG. 7 which defines a maximum throughflow rate at the flow regulator unit 5 is then assumed.

It can be seen that the adjustment path 10 is longer in FIG. 7 than in FIG. 6.

FIGS. 8 to 10 show a further sanitary fixture 1 according to the invention. Components and functional units which are similar or identical structurally and/or functionally to the exemplary embodiments according to FIGS. 1 to 7 are denoted by the same reference numbers and are not described separately. The above explanations therefore apply correspondingly.

In the exemplary embodiment according to FIGS. 8 to 10, a stacked arrangement of bimetallic elements 28 is used instead of the material having shape memory.

Each bimetallic element 28 is of disk-shaped design, wherein two material components 25, 26 having different thermal coefficients of expansion are connected to each other in each disk.

The bimetallic element 28 therefore converts different heating of the various material components 25, 26 connected to each other into a macroscopic shape change, by way of which the adjustment element 6 can be adjusted.

FIG. 8 shows the starting position of the adjustment element 6 at the lower temperature value, and FIG. 9 shows the end position of the adjustment element 6 at the upper temperature value. Each bimetallic element 28 is curved in the end position.

Since the bimetallic elements 28 expand continuously with increasing temperature, the adjustment amount 6 is displaced in intermediate positions along the adjustment path 10 at intermediate temperature values between the lower temperature value and the upper temperature value.

In the event of cooling, each bimetallic element 28 is deformed back again into the starting shape according to FIG. 8. The water pressure bearing against the input side 3 generally suffices in order to adjust the adjustment element 6 back into the starting position.

A restoring spring (not illustrated specifically) which can be guided by the guide element 15 as described previously can be provided in a supporting manner analogously to the preceding exemplary embodiment.

Figure 11:
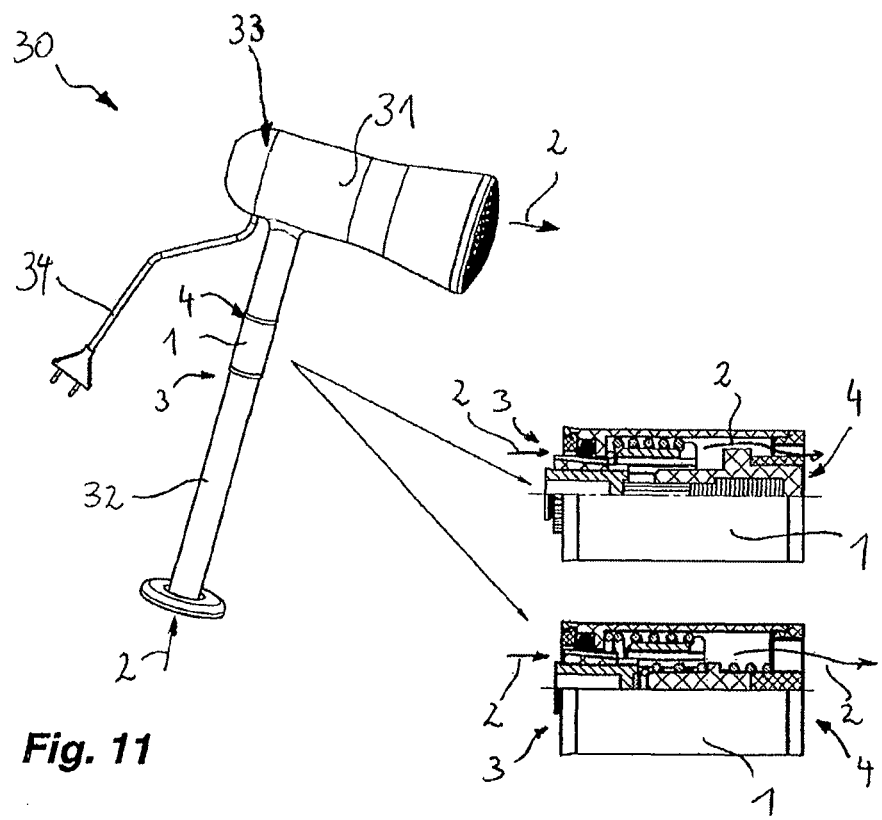
FIG. 11 shows a shower arrangement according to the invention.

FIG. 11 shows a shower arrangement 30 according to the invention.

The shower arrangement 30 has a shower head 31 which is fastened to a supply line 32.

The supply line 32 is fastened to a wall or ceiling (not illustrated specifically).

A heating element 33 which is operable via an electric connection 34 in order to heat up the water from the supply line 32 is arranged on the shower head 31. The heating element 33 has a constant heat output which is given by the electric power consumption.

The supply line 32 defines a flow path 2 for flowing water.

In said flow path 2, a sanitary fixture 1 according to the invention is inserted into the supply line 32. By way of example, FIG. 11 illustrates, on the right, the sanitary fixtures according to FIGS. 1 to 3 (at the top) and according to FIGS. 4 to 7 (at the bottom). However, use can also be made of other sanitary fixtures 1 according to the invention, for example the sanitary fixture 1 according to FIGS. 8 to 10.

In further exemplary embodiments, the shower head 31 can also be in the form of a handheld shower or side shower.

During operation, the sanitary fixture 1 sets the throughflow rate as a function of the water temperature on the input side 3 in such a manner that the heating element 33 heats the flow of water to a constant use temperature. Accordingly, the closer the water temperature on the input side 3 moves to the use temperature, the greater the throughflow rate becomes. The throughflow rate is conversely lower, the greater the distance is between the water temperature and the input side 3 and the use temperature, and therefore the limited heat output of the heating element 33 suffices in order actually to reach the use temperature.

Since, as described, the adjustment element 6 is displaceable in precise stages or even continuously as a function of temperature, even relatively small temperature fluctuations during operation, such as occur, for example, when changing stagnant water to freshly supplied water from the mains, can be compensated for.

In the case of a sanitary fixture 1 having a flow regulator unit 5 and a movable adjustment element 6 which sets a throughflow rate and is in control connection with a temperature-sensitive control element 8, it is proposed to arrange a restoring spring 13 in the direction of flow on the same side of the flow regulator unit 5 as the control element 5, and/or to design the control element 8 to take up at least one intermediate position.

LIST OF REFERENCE NUMBERS

1 Sanitary fixture
2 Flow path
3 Input side
4 Output side
5 Flow regulator unit
6 Adjustment element
7 Longitudinal axis
8 Control element
9 Piston
10 Adjustment path
11 Receiving chamber
12 Material mixture
13 Restoring spring
14 Interior space
15 Guide element
16 Outer cylinder
17 Throughflow duct
18 O-ring
19 Opening
20 Groove
21 Tubular sleeve
22 First insert
23 Rib
24 Second insert
25 Material component
26 Material component
27 Guide element
28 Bimetallic element
29 Control connection
30 Shower arrangement
31 Shower head
32 Supply line
33 Heating element
34 Connection
35 Zigzag spring
36 Wire
37 Trough
38 Peak
39 Winding

The invention claimed is:

1. A sanitary fixture (1) comprising a flow regulator unit (5) which is arranged in a flow path (2) including a movable adjustment element (6), wherein a throughflow rate defined by the flow regulator unit (5) is settable by the adjustment element (6), a control element (8) which changes at least one of a shape or size depending on a temperature arranged in the flow path (2) and operatively connected to the adjustment element (6), wherein, in the event of a change in the temperature over a temperature range between a lower temperature value and an upper temperature value, the control element (8) displaces the adjustment element (6) along an adjustment path (10) between a starting position and an end position, and at at least one intermediate temperature value between the lower temperature value and the upper temperature value, the control element (8) sets an intermediate position of the adjustment element (6) in the adjustment path between the starting position and the end position.

2. The sanitary fixture (1) according to claim 1, wherein the intermediate position is spaced apart from at least one of the starting position or the end position by at least 1% of an overall length of the adjustment path (10).

3. The sanitary fixture (1) according to claim 1, wherein the control element (8) assumes at least one of three different shapes or sizes at at least three different temperature values.

4. The sanitary fixture according to claim 1, wherein the control element (8) has at least two material components (25, 26) which have different coefficients of expansion or different phase transition temperatures or both within the temperature range.

5. The sanitary fixture (1) according to claim 1, wherein the adjustment element (6) includes a bimetallic element (28).

6. The sanitary fixture (1) according to claim 4, wherein the material components (25, 26) are arranged in succession in an adjustment direction.

7. The sanitary fixture (1) according to claim 4, wherein the material components (25, 26) comprise a material mixture, the material mixture is a thermowax mixture, and the material components (25, 26) are in each case a thermowax component and the phase transition temperatures are given by a particular melting point of the thermowax component.

8. The sanitary fixture (1) according to claim 1, wherein the adjustment element (6) defines a lower throughflow rate in the starting position than in the end position.

9. The sanitary fixture (1) according to claim 1, further comprising a guide element (15) carrying the restoring spring (13) formed on the adjustment element (6), and the guide element (15) encloses a throughflow duct (17).

10. A shower arrangement (30) having a heating element (33) which is arranged in the flow path (2) designed for constant heat output, and having a sanitary fixture (1) according to claim 1 connected upstream of the heating element (33) in the flow direction.

11. The sanitary fixture (1) according to claim 1, wherein an increase in the temperature at the control element (8) causes a displacement of the adjustment element (6) towards greater throughflow rates.

12. The sanitary fixture (1) according to claim 4, wherein the material components (25, 26) are formed in each case from a material having shape memory.

13. The sanitary fixture (1) according to claim 1, wherein a throughflow rate of the flow regulator unit (5) which increases with increasing temperature is set by the control element (8) and the adjustment element (6).

* * * * *